United States Patent
Phillips et al.

[11] Patent Number: 6,070,651
[45] Date of Patent: Jun. 6, 2000

[54] THERMAL HEATING AND COOLING FAN DEVICE

[76] Inventors: Judith Phillips, 870 W. Rose St.; David B. Phillips, 870 W. Rose, both of Lebanon, Oreg. 97355

[21] Appl. No.: 09/124,726

[22] Filed: Jul. 30, 1998

[51] Int. Cl.[7] ........................................ F24H 3/00
[52] U.S. Cl. ..................... 165/47; 165/48.1; 165/122; 165/163; 62/406; 62/387
[58] Field of Search .............. 165/163, 47, 45, 165/48.1, 104.31; 62/387, 244, 406

[56] References Cited

U.S. PATENT DOCUMENTS

| | | | |
|---|---|---|---|
| 58,033 | 9/1866 | Wright | 165/47 |
| 583,370 | 5/1897 | Heller | 165/47 |
| 1,189,470 | 7/1916 | O'Brien | 165/122 |
| 1,884,095 | 10/1932 | Modine | 165/122 |
| 2,025,216 | 12/1935 | Opitz | 165/47 |
| 2,200,214 | 5/1940 | Carter | 165/122 |
| 2,707,868 | 5/1955 | Goodman | 165/150 |
| 2,995,647 | 8/1961 | Bernard | 219/137.62 |
| 3,196,939 | 7/1965 | Erbe et al. | 165/104.21 |
| 4,258,780 | 3/1981 | Suo | 165/45 |
| 5,121,788 | 6/1992 | Carollo | 165/47 |
| 5,183,100 | 2/1993 | Harrell, Jr. | 165/45 |
| 5,524,820 | 6/1996 | Regan | 237/19 |
| 5,738,164 | 4/1998 | Hildebrand | 165/45 |

Primary Examiner—Ira S. Lazarus
Assistant Examiner—Terrell McKinnon

[57] ABSTRACT

A thermal heating and cooling fan device for providing warm or cool air from the circulation of warm or cool fluid therethrough. The device includes a housing having a pair of opposite open ends. A first transfer coil is provided in the interior of the housing. Intake and output conduits are fluidly connected to opposite ends of the first transfer coil. The distal ends of the intake and output conduits are fluidly connectable to a fluid source. The distal end of the intake conduit is designed for drawing fluid into the intake conduit and the distal end of the output conduit is designed for discharging fluid from the output conduit. A pump is provided for pumping fluid from the input conduit through the first transfer coil to the output conduit. A fan is provided in the housing for moving air from one open end of the housing through the interior of the housing over the first transfer coil to another open end of the housing.

4 Claims, 2 Drawing Sheets

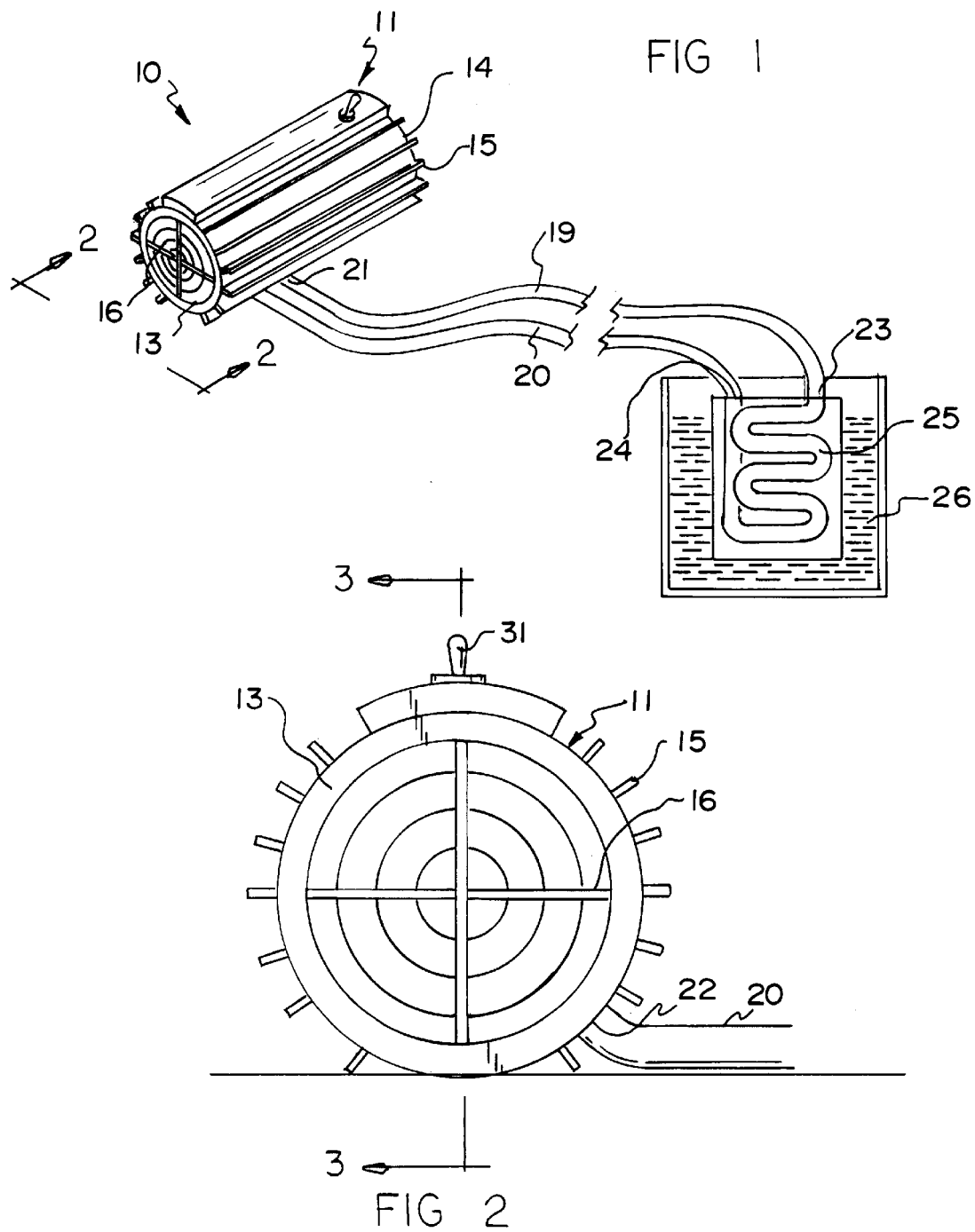

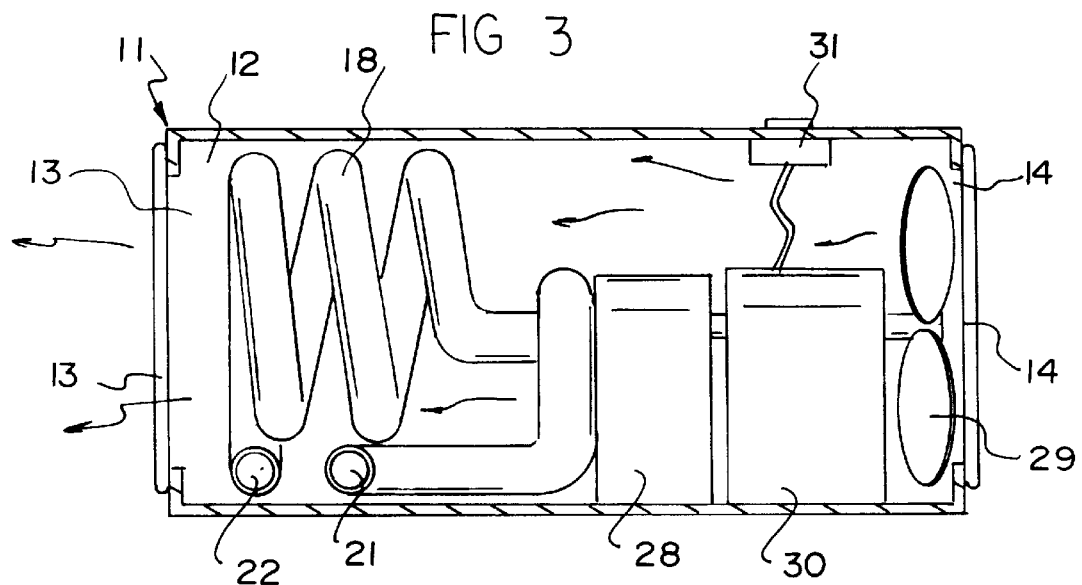
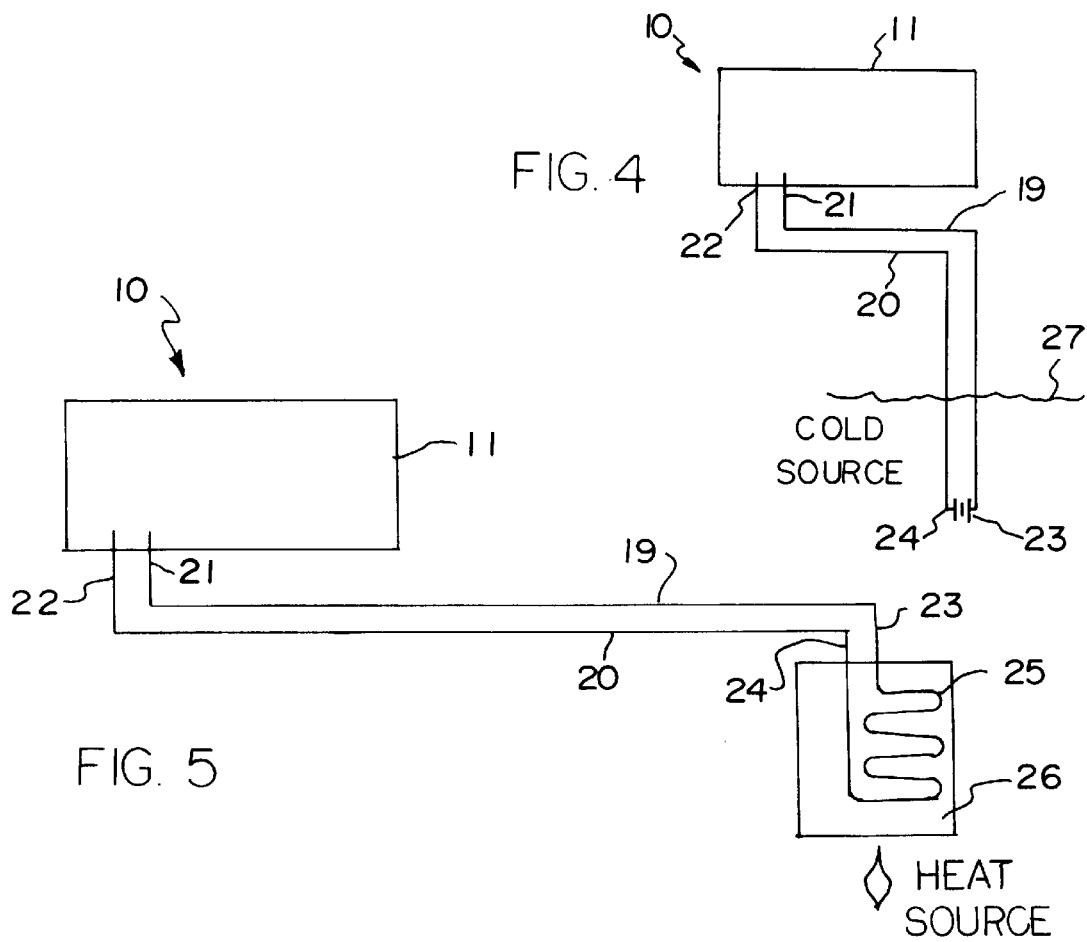

THERMAL HEATING AND COOLING FAN DEVICE

BACKGROUND OF THE INVENTION

1. Field of the Invention

The present invention relates to heating and cooling devices for camping and more particularly pertains to a new thermal heating and cooling fan device for providing warm or cool air from the circulation of warm or cool fluid therethrough.

2. Description of the Prior Art

The use of heating and cooling devices for camping is known in the prior art. More specifically, heating and cooling devices for camping heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,996,970; 5,460,161; 3,961,496; 2,736,176; 5,030,389; and 2,161,667.

While these devices fulfill their respective, particular objectives and requirements, the aforementioned patents do not disclose a new thermal heating and cooling fan device. The inventive device includes a housing having a pair of opposite open ends. A first transfer coil is provided in the interior of the housing. Intake and output conduits are fluidly connected to opposite ends of the first transfer coil. The distal ends of the intake and output conduits are fluidly connectable to a fluid source. The distal end of the intake conduit is designed for drawing fluid into the intake conduit and the distal end of the output conduit is designed for discharging fluid from the output conduit. A pump is provided for pumping fluid from the input conduit through the first transfer coil to the output conduit. A fan is provided in the housing for moving air from one open end of the housing through the interior of the housing over the first transfer coil to another open end of the housing.

In these respects, the thermal heating and cooling fan device according to the present invention substantially departs from the conventional concepts and designs of the prior art, and in so doing provides an apparatus primarily developed for the purpose of providing warm or cool air from the circulation of warm or cool fluid therethrough.

SUMMARY OF THE INVENTION

In view of the foregoing disadvantages inherent in the known types of heating and cooling devices for camping now present in the prior art, the present invention provides a new thermal heating and cooling fan device construction wherein the same can be utilized for providing warm or cool air from the circulation of warm or cool fluid therethrough.

The general purpose of the present invention, which will be described subsequently in greater detail, is to provide a new thermal heating and cooling fan device apparatus and method which has many of the advantages of the heating and cooling devices for camping mentioned heretofore and many novel features that result in a new thermal heating and cooling fan device which is not anticipated, rendered obvious, suggested, or even implied by any of the prior art heating and cooling devices for camping, either alone or in any combination thereof.

To attain this, the present invention generally comprises a housing having a pair of opposite open ends. A first transfer coil is provided in the interior of the housing. Intake and output conduits are fluidly connected to opposite ends of the first transfer coil. The distal ends of the intake and output conduits are fluidly connectable to a fluid source. The distal end of the intake conduit is designed for drawing fluid into the intake conduit and the distal end of the output conduit is designed for discharging fluid from the output conduit. A pump is provided for pumping fluid from the input conduit through the first transfer coil to the output conduit. A fan is provided in the housing for moving air from one open end of the housing through the interior of the housing over the first transfer coil to another open end of the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new thermal heating and cooling fan device apparatus and method which has many of the advantages of the heating and cooling devices for camping mentioned heretofore and many novel features that result in a new thermal heating and cooling fan device which is not anticipated, rendered obvious, suggested, or even implied by any of the prior art heating and cooling devices for camping, either alone or in any combination thereof.

It is another object of the present invention to provide a new thermal heating and cooling fan device which may be easily and efficiently manufactured and marketed.

It is a further object of the present invention to provide a new thermal heating and cooling fan device which is of a durable and reliable construction.

An even further object of the present invention is to provide a new thermal heating and cooling fan device which is susceptible of a low cost of manufacture with regard to both materials and labor, and which accordingly is then susceptible of low prices of sale to the consuming public, thereby making such thermal heating and cooling fan device economically available to the buying public.

Still yet another object of the present invention is to provide a new thermal heating and cooling fan device which provides in the apparatuses and methods of the prior art some of the advantages thereof, while simultaneously overcoming some of the disadvantages normally associated therewith.

Still another object of the present invention is to provide a new thermal heating and cooling fan device for providing warm or cool air from the circulation of warm or cool fluid therethrough.

Yet another object of the present invention is to provide a new thermal heating and cooling fan device which includes a housing having a pair of opposite open ends. A first transfer coil is provided in the interior of the housing. Intake and output conduits are fluidly connected to opposite ends of the first transfer coil. The distal ends of the intake and output conduits are fluidly connectable to a fluid source. The distal end of the intake conduit is designed for drawing fluid into the intake conduit and the distal end of the output conduit is designed for discharging fluid from the output conduit. A pump is provided for pumping fluid from the input conduit through the first transfer coil to the output conduit. A fan is provided in the housing for moving air from one open end of the housing through the interior of the housing over the first transfer coil to another open end of the housing.

Still yet another object of the present invention is to provide a new thermal heating and cooling fan device that can be used to provided warm or cool air to a tent when camping.

Even still another object of the present invention is to provide a new thermal heating and cooling fan device that is easily portable so that it can be carried to a camp site.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new thermal heating and cooling fan device according to the present invention.

FIG. 2 is a schematic end view of the present invention as seen from the vantage of line 2—2 of FIG. 1.

FIG. 3 is a schematic cross sectional view of the housing of the present invention taken from line 3—3 of FIG. 2.

FIG. 4 is a schematic view of the present invention for providing cool air.

FIG. 5 is a schematic view of the present invention for providing warm air.

DESCRIPTION OF THE PREFERRED EMBODIMENT

With reference now to the drawings, and in particular to FIGS. 1 through 5 thereof, a new thermal heating and cooling fan device embodying the principles and concepts of the present invention and generally designated by the reference numeral 10 will be described.

As best illustrated in FIGS. 1 through 5, the thermal heating and cooling fan device 10 generally comprises a housing 11 having a pair of opposite open ends 13,14. A first transfer coil 18 is provided in the interior 12 of the housing 11. Intake and output conduits 19,20 are fluidly connected to opposite ends of the first transfer coil 18. The distal ends 23,24 of the intake and output conduits 19,20 are fluidly connectable to a fluid source. The distal end of the intake conduit 19 is designed for drawing fluid into the intake conduit 19 and the distal end of the output conduit 20 is designed for discharging fluid from the output conduit 20. A pump 28 is provided for pumping fluid from the input conduit through the first transfer coil 18 to the output conduit 20. A fan 29 is provided in the housing for moving air from one open end of the housing 11 through the interior 12 of the housing 11 over the first transfer coil 18 to another open end of the housing 11.

In closer detail, the housing 11 is generally tubular and has an interior 12, and a pair of opposite open ends 13,14. The housing 11 is preferably generally cylindrical although optionally, the housing 11 may also be generally rectangular. The exterior surface of the housing 11 has a plurality of fins 15 extending radially outwards therefrom with the length of each fin 15 extending between the open ends 13,14 of the housing 11. Preferably, each of the open ends 13,14 also has a protective screen 16,17 or grate extending thereacross to prevent objects larger than an predetermined size from passing into the interior 12 of the housing 11. In an ideal illustrative embodiment, the housing 11 has a length defined between the open ends 13,14 of the housing 11 of about 7 inches, a height of about 4½ inches and a width of about 5¼ inches. Ideally, the housing 11 comprises a metal such as aluminum.

A first heat transfer coil 18 is provided in the interior 12 of the housing 11. Preferably, the first transfer coil 18 is positioned towards one of the open ends 13 of the housing 11. The first transfer coil 18 is designed for convectionally transferring heat or cold from a fluid inside the transfer coil to the air in the interior 12 of the housing 11. The proximal ends 21,22 of elongate intake and output conduits 19,20 are fluidly connected to opposite ends of the first transfer coil 18. The intake and output conduits 19,20 are outwardly extended from the housing 11 and terminate at distal ends 23,24 for intaking and discharging fluids respectively. Ideally, the intake and output conduits 19,20 each comprise lengths of flexible tubing such as a hose to permit easy positioning of the hose in a desired location and for convenient storage. The distal ends 23,24 of the intake and output conduits 19,20 are adapted fluidly connectable to a fluid source. Specifically, the distal end 23 of the intake conduit 19 is designed for drawing fluid into the intake conduit 19 and the distal end 24 of the output conduit 20 is designed for discharging fluid from the output conduit 20.

Preferably, the distal ends 23,24 of the intake and output conduits 19,20 are fluidly connected to opposite ends of a second heat transfer coil 25 located outside of the housing 11. Together, the first and second transfer coils 18,25 and the intake and output conduits 19,20 form a circulatory system with a fluid such as water provided in the circulatory system. The second transfer coil 25 is submergible into a body of fluid (including both hot and cold fluids such as hot and cold water) for convectionally transferring heat between the fluid in the circulatory system and the body of fluid in which the second transfer coil 25 is submerged. For example, for heating, the second transfer coil 25 may be submerged in a ½ gallon container of water next to a camp fire, over a pile of burning barbecue briquettes, or even on top of a lantern. Examples for cooling the second transfer coil 25 include submerging the second transfer coil in a lake or a stream, in an ice chest or cooler and even a bucket of cool water. Optionally, the distal ends 23,24 of the intake and output conduits 19,20 without the second transfer coil 25 are submergible into a body of water 27 such as a lake or even a bucket of water to draw water into the intake conduit 19 from the body of water 26 and discharge water from the output conduit 20 into the body of water 26 as illustrated in FIG. 4.

A pump 28 for pumping fluid from the input conduit through the first transfer coil 18 to the output conduit 20 is provided in the interior 12 of the housing 11. A fan 29 is also provided in the interior of the housing for moving air from one open end of the housing 11 through the interior 12 of the housing 11 over the first transfer coil 18 to another open end of the housing 11. Preferably, the fan 29 is positioned at an open end 14 of the housing 11 distal the first transfer coil 18. A motor 30 for powering the fan 29 and the pump 28, the motor 30 is also provided in the interior 12 of the housing 11. A switch 31 is provided on the exterior surface of the housing 11 and is electrically connected to the motor 30 for selectively activating the motor 30 to selectively power the pump 28 and fan 29.

In use to provide warm air, the second transfer coil 25 in submerged in a warm or hot water reservoir 26 to heat the fluid in the second transfer coil 25. The heated fluid is then pumped through the first transfer coil 18 where the fan 29 blows air over the first transfer coil 18 to heat the air to provided warm air to a location such as the inside of a tent. In use provide cool air, the second transfer coil 25 in submerged in a cool or cold water reservoir to cool the fluid in the second transfer coil 25. The cooled fluid is then pumped through the first transfer coil 18 where the fan 29 blows air over the first transfer coil 18 to cool the air to provided cool air to a location such as the inside of a tent.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A device for providing warm or cool air to a location, said device comprising:

a housing being generally tubular and having an interior, and a pair of opposite open ends;

said housing being generally cylindrical and having an exterior surface and a longitudinal axis extending between said open ends of said housing;

said exterior surface of said housing having a plurality of fins extending radially outwards therefrom, each of said fins having a length extending between said open ends of said housing;

each of said open ends having a protective screen extending thereacross to prevent objects larger than an predetermined size from passing into said interior of said housing;

a first heat transfer coil being provided in said interior of said housing, said first transfer coil being positioned towards a first open end of said pair of open ends of said housing, said first heat transfer coil being for convectionally transferring beat or cold from a fluid inside the transfer coil to the air in the interior of said housing;

proximal ends of elongate intake and output conduits being fluidly connected to opposite ends of said first transfer coil, said intake and output conduits being outwardly extended from said housing, said intake and output conduits having distal ends for intaking and discharging fluids respectively;

a second heat transfer coil having opposite ends fluidly connected to said distal ends of said intake and output conduits, said second heat transfer coil being located outside of the housing;

said first and second transfer coils and said intake and output conduits forming a continuous circulatory system such that a fluid provided in said circulatory system may be continuously circulated through said first and second transfer coils for transferring heat between said first and second transfer coils;

said second transfer coil being submergible into a body of fluid for convectionally transferring heat between the fluid in the circulatory system and the body of fluid in which the second heat transfer coil is submerged;

each of said intake and output conduits extending between said first and second transfer coils comprising a length of flexible tubing to facilitate submersion of said second transfer coil without submerging said housing and said first transfer coil;

a pump for pumping fluid from said input conduit through said first transfer coil to said output conduit such that the fluid is circulated between the first and second transfer coils, said pump being provided in said interior of said housing;

a fan for moving air from one open end of said housing through said interior of said housing over said first transfer coil to another open end of said housing, said fan being position at an open end of said housing distal said first transfer coil;

a motor for powering said fan and said pump, said motor being provided in said interior of said housing;

a switch being provided on said exterior surface of said housing, said switch being electrically connected to said motor for selectively activating said motor to selectively power said pump and fan;

wherein the second heat transfer coil may be submerged in a hot fluid reservoir to heat the fluid in the second heat transfer coil which is pumped into the first heat transfer coil to warm air blown over the first heat transfer coil by the fan when the device is used to provide warm air; and wherein the second heat transfer coil may be submerged in a cold fluid reservoir to cool the fluid in the second heat transfer coil which is pumped into the first heat transfer coil to cool air blown over the first heat transfer coil by the fan when the device is used to provide cool air.

2. The device of claim 1, wherein said housing has a length defined between said open ends of said housing of about 7 inches.

3. The device of claim 1, wherein said housing comprises a metal.

4. The device of claim 1, wherein said housing comprises aluminum.

* * * * *